(12) United States Patent
Ashe

(10) Patent No.: US 11,780,480 B1
(45) Date of Patent: Oct. 10, 2023

(54) SIMPLIFYING COMPLEX RAIL TURNOUT GEOMETRY FOR COMPUTING AND CONVERGING CONNECTIONS

(71) Applicant: Bentley Systems, Incorporated, Exton, PA (US)

(72) Inventor: Joseph G. Ashe, McDonough, GA (US)

(73) Assignee: Bentley Systems, Incorporated, Exton, PA (US)

( * ) Notice: Subject to any disclaimer, the term of this patent is extended or adjusted under 35 U.S.C. 154(b) by 705 days.

(21) Appl. No.: 16/590,028

(22) Filed: Oct. 1, 2019

(51) Int. Cl.
- *B61L 23/04* (2006.01)
- *G06Q 10/0631* (2023.01)
- *G06Q 10/0635* (2023.01)
- *B61L 25/08* (2006.01)
- *B61L 27/53* (2022.01)

(52) U.S. Cl.
CPC .............. *B61L 23/047* (2013.01); *B61L 25/08* (2013.01); *B61L 27/53* (2022.01); *G06Q 10/0635* (2013.01); *G06Q 10/06315* (2013.01)

(58) Field of Classification Search
CPC ........ B61L 23/047; B61L 27/53; B61L 25/08; G06Q 10/06315; G06Q 10/0635
See application file for complete search history.

(56) References Cited

U.S. PATENT DOCUMENTS

| | | | | |
|---|---|---|---|---|
| 5,375,797 A | * | 12/1994 | Willow | E01B 7/00 246/435 R |
| 2003/0204385 A1 | * | 10/2003 | Klauder, Jr. | B61F 5/22 703/2 |
| 2007/0027661 A9 | * | 2/2007 | Klauder, Jr. | E01B 2/00 703/2 |

FOREIGN PATENT DOCUMENTS

| | | | |
|---|---|---|---|
| CN | 207468991 U | * | 6/2018 |
| CN | 109242131 A | * | 1/2019 |

OTHER PUBLICATIONS

Rapp, Overview of issues and research related to special trackwork for shared high-speedrail passenger and heavy-axle-load freight operations, Proc IMechE Part F: J Rail and Rapid Transit 2014, vol. 228(5) 557-565 (Year: 2014).*

Wang/Ma, Optimization of Rail Profiles to Improve Vehicle Running Stability in Switch Panel of High-Speed Railway Turnouts, Mathematical Problems in Engineering vol. 2017, Article ID 2856030 (Year: 2017).*

Plotkin, Research Results a Higher Speed Turnout, US Department of transportation Federal Railroad Administration, RR06-10 (Year: 2006).*

(Continued)

*Primary Examiner* — Michael J Dalbo
(74) *Attorney, Agent, or Firm* — Cesari and McKenna, LLP; James A. Blanchette

(57) ABSTRACT

In various embodiments, techniques are provided for determining a connection between a rail turnout and another rail turnout or other rail element by a geometry connection process of rail network design software, by reducing the actual complex geometry of the rail turnout to a simplified arc, which at one end is tangent to the geometry of a connecting element at end of the rail turnout and at the other end is tangent to the geometry of a parent base element of the rail turnout. The simplified arc is utilized instead of the actual complex geometry of the rail turnout by a connection computation engine to determine the connection in the model (e.g., by fitting a connection solution using least squares).

20 Claims, 9 Drawing Sheets

(56) References Cited

OTHER PUBLICATIONS

"Adding Value to Rail Projects with OpenRail," Bentley Systems, Incorporated, 2016, pp. 1-42.
Bradshaw, Richard, "Bentleyuser.dk Årsmøde 2012," Nordic Civil 2012, Bentley Civil Workshop, X09 Power Rail Track, Bentley User Group Denmark, Bentley Systems, Incorporated, 2012, pp. 1-42.
"European Curve ad Turnout Mechanics," Chapter 12, Arema, 2003, pp. 513-535.
Miller, Steven J., "The Method of Least Squares," Jul. 21, 2006, pp. 1-7.

* cited by examiner

SIMPLIFYING COMPLEX RAIL TURNOUT GEOMETRY FOR COMPUTING AND CONVERGING CONNECTIONS

BACKGROUND

Technical Field

The present disclosure relates generally to rail network design software, and more specifically to determination of a connection between a rail turnout and another rail turnout or other rail element by rail network design software.

Background Information

A variety of software applications have been developed to assist in the design of rail networks. Such applications may provide a modeling environment to support various stages of rail network design, from concept through construction, maintenance, and operations. A variety of technical challenges are confronted by rail network design software. One specific challenge is determining a connection between a rail turnout and another rail turnout or other rail element.

Rail turnouts are often described in rail network design software using complex geometries that capture the information in schematics provided by manufacturers. Such complex geometries may include combinations of spirals, arcs, line segments and/or other geometric primitives. FIG. 1 is a vendor diagram 100 of an example rail turnout including numerical data describing a complex geometry. Such vendor diagram may be provided by a manufacturer of the rail turnout. FIG. 2 is a schematic diagram 200 of a rail turnout showing key points (e.g., points P0, P1, P2, and P3) used to model the turnout. Using the numerical data in the vendor diagram a user may define (e.g., in a dialog box) in the network design software distances between these key points (e.g., mainline length, triangle length, etc.) and their spatial relationships (e.g., ratio, etc.). The user may also define the geometry that connects points P1 and P3. Line 210 graphically illustrates a complex geometry (e.g., including multiple spirals, arcs, line segments and/or other geometric primitives) connecting points P1 and P3. A mainline portion of the rail turnout may be located along a parent base element (not shown) of the rail network (e.g., that extends through point P1 and P2). The parent base element may represent a rail line having any of a variety of geometries (e.g., line, arc, etc.). An attachment line (not shown) may extend along the geometry of the parent base element up to point P1. A connecting element (not shown) may be connected to the end of the turnout (e.g., at point P3) and join the rail turnout to another rail turnout or other rail element on another rail line. The connecting element may have any of a variety of geometries (e.g., line, arc, etc.).

The rail network design software may be called upon to determine a connection between the rail turnout and another rail turnout or other rail element. In determining the connection, some parameters may be free, and thereby changeable, and other may be fixed, and thereby unchangeable. For example, the location of the rail turnout along a mainline may be free, while the location of another rail turnout along a branch line may be fixed. Determining the connection may involve attempting to fit a solution (e.g., using least squares) describing changes to the free parameters to a system linear equations. The more complex the geometries of the rail turnout(s) the more complex the system of linear equations becomes. In particular, the inclusion of spirals in a geometry may greatly increase complexity (e.g., due to their multiple possible types, equations and bending rules). As complexity increases, the likelihood of successfully converging to a connection solution decrease, such that the software may be incapable of determining the connection. Likewise, as the complexity of the system of linear equations increases, processing and memory resources utilized by the rail network design software increases. Such increased use of processing and memory resources may also be undesirable. Even if a connection may be determined, it may not be determined efficiently.

Accordingly, there is a need for improved techniques for determining a connection between a rail turnout and another rail turnout or other rail element by rail network design software that may address some or all of these shortcomings.

SUMMARY

In various embodiments, techniques are provided for determining a connection between a rail turnout and another rail turnout or other rail element by a geometry connection process of rail network design software, by reducing the actual complex geometry of the rail turnout to a simplified arc, which at one end is tangent to a geometry of a connecting element, and at the other end is tangent to the geometry of a parent base element. The simplified arc may be tangent to the geometry of the parent base element at a different point than the actual complex geometry of the turnout, such that a new attachment element (e.g., an attachment line, attachment arc, etc.) is different than an original attachment element. The simplified arc is utilized instead of the actual complex geometry of the rail turnout by a connection computation engine to determine the connection (e.g., by fitting a connection solution using least squares). Due to the decreased complexity, a connection solution can typically be converged to, preventing computation failure, and processing and memory resource may be decreased, among other benefits.

In one example embodiment, a geometry connection process accesses the actual geometry of a rail turnout located along a parent base element to be connected at an end to a connecting element. The actual geometry of the rail turnout includes a combination of one or more geometric primitives (e.g., spirals, arcs, line segments, etc.). The geometry connection process reduces the actual geometry of the rail turnout to a simplified arc that at one end is tangent to a geometry of the connecting element. The geometry connection process further creates an attachment to the parent base element such that the simplified arc is tangent to the geometry of the parent base element. The simplified arc is provided to a connection computation engine that determines a connection solution using the geometry of the parent base element, the simplified arc, and the geometry of the connecting element, and possibly other geometries. However, the actual geometry of the rail turnout is not used in determining the connection solution. The connection solution is returned, for example, displayed on a display screen or stored on a storage device.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The description refers to the accompanying drawings of example embodiments, of which.

DETAILED DESCRIPTION

Definitions

As used herein, the term "parent base element" refers to an element of a model of a rail network along which a rail turnout is located.

As used herein, the term "connecting element" refers to an element of a model of a rail network joined to the end of a rail turnout.

As used herein the term "attachment element" refers to an element a model of a rail network that extends along at least a portion of a parent base element, sharing geometry therewith, that is used for purposes of attaching another element thereto.

Example Embodiments

Figure 1:
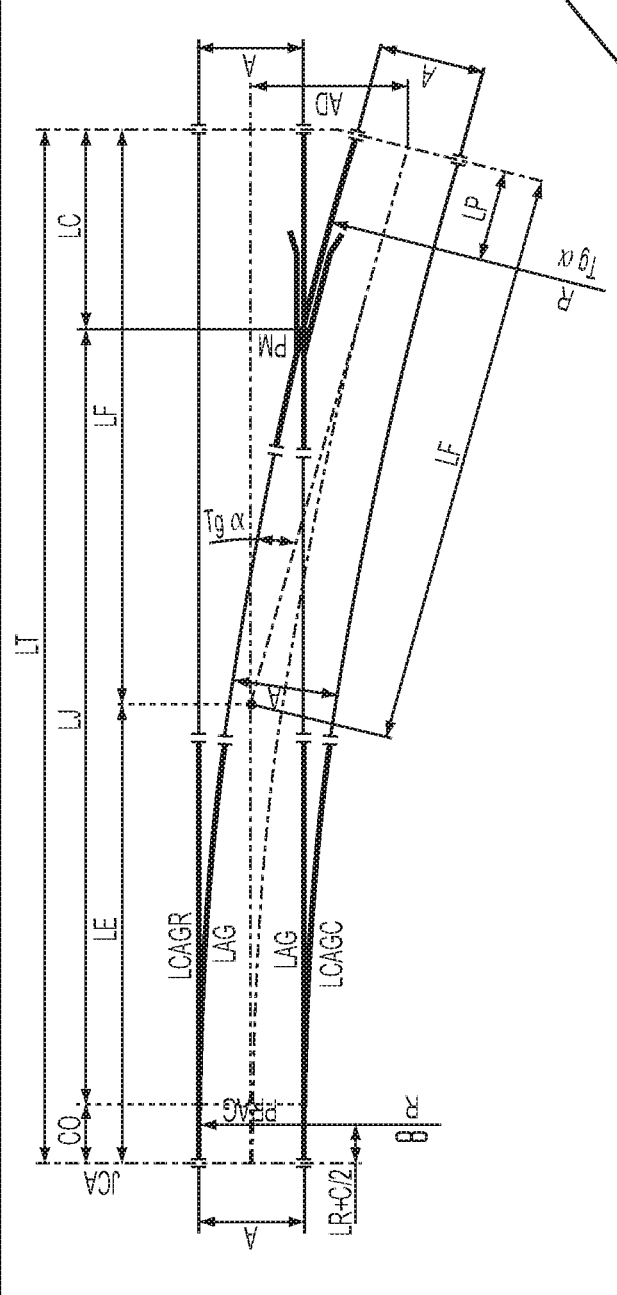
FIG. 1 is a vendor diagram of an example rail turnout including numerical data describing a complex geometry.
Figure 2:
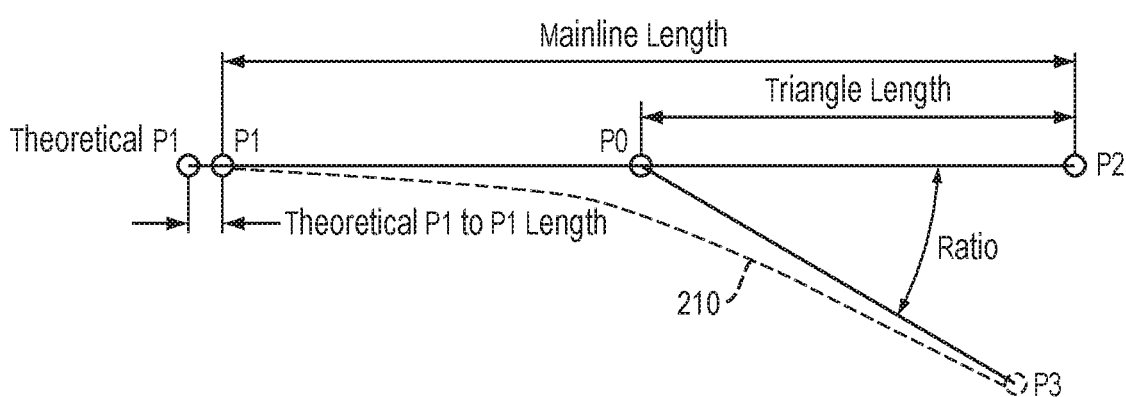
FIG. 2 is a schematic diagram of a rail turnout showing key points (e.g., points P1, P0, P2, and P3) used to model the turnout.
Figure 3:
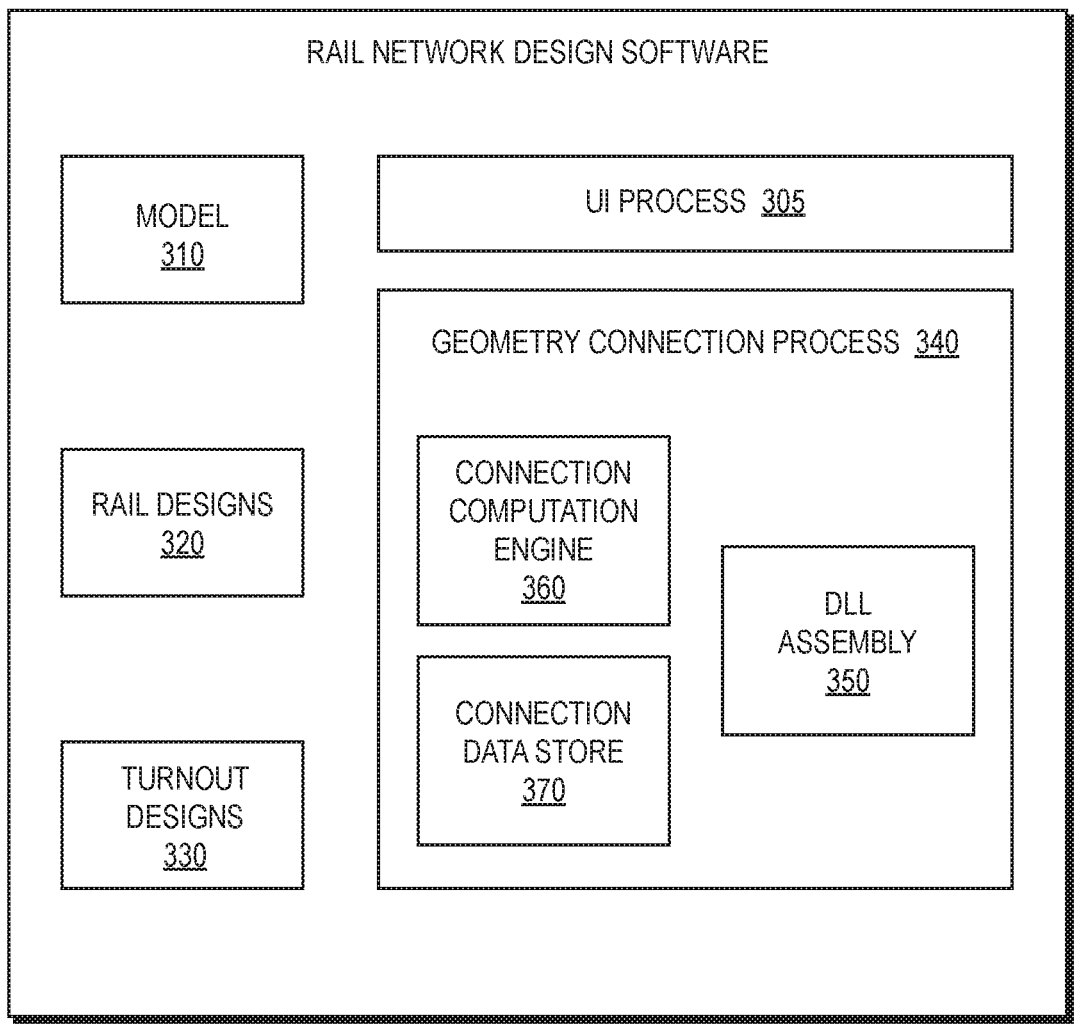
FIG. 3 is high-level block showing portions of an example software architecture for rail network design software.

FIG. 3 is high-level block showing portions of an example software architecture for rail network design software 300. In one embodiment, the rail network design software 300 is the OpenRail™ rail network design software available from Bentley Systems, Incorporated, however it should be understood that the software may take other forms. The rail network design software 300 is executed on one or more electronic devices (e.g., computers) that each may include processors, memory, storage devices, display devices and/or other hardware. In some implementations, one or more of the electronic devices may be locally disposed, and one or more of the electronic devices may be located in the cloud. For example, the rail network design software 300 may utilize a connected data environment (CDE) executing on electronic devices in the cloud that provides a framework for collaboration and central data management, and local clients executing on local electronic devices that provide user interfaces, modeling tools, and other functionality.

The network design software 300 may include a user interface (UI) module 305 that provides a graphical user interface (GUI) usable to create a model 310 a rail network that utilizes rail designs 320 and turnout designs 330 obtained from a component library (not shown) or specially defined by the user. When creating such a model, it is often necessary to connect a rail turnout (e.g., along a mainline) to another rail turnout or other rail element (e.g., along a branch line) by a connecting element. A geometry connection process 340 may be provided by the network design software 300 that automatically determines the connection between the rail turnout and another rail turnout or other rail element, based on various fixed and free parameters. To permit such operation, the geometry connection process 340 may include a dynamic link library (DLL) assembly 350 that, among other functions, accesses and simplifies geometry as discussed below, a connection computation engine 360 that determines and returns a connection solution, and a connection data store 370 that maintains the returned connection solution, to be retrieved for display by the UI process 305, persistently stored to a storage device, or otherwise utilized.

Figure 4:
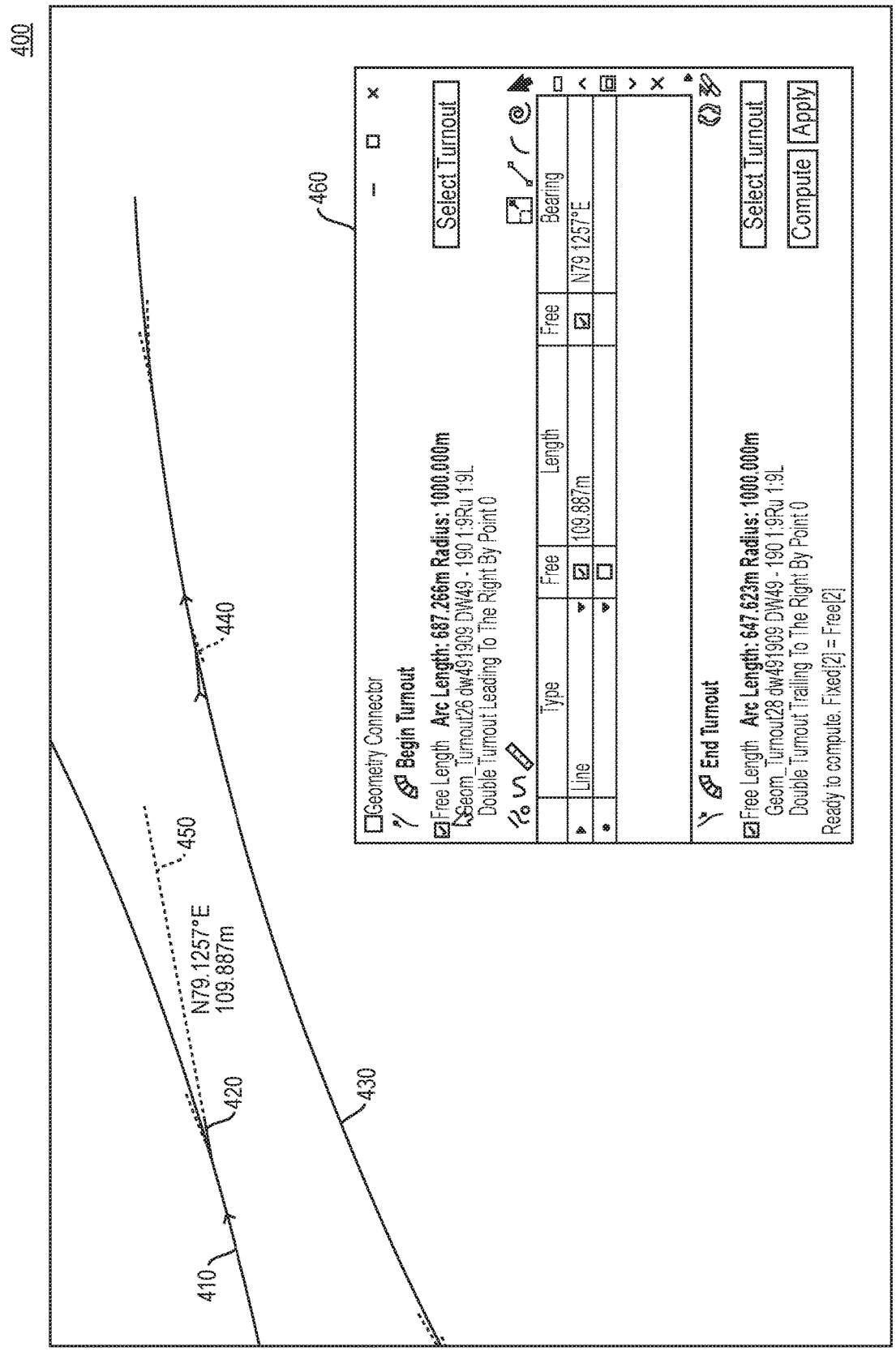
FIG. 4 is a screen shot of an example GUI of the rail network design software illustrating user interaction to connect a rail turnout and another rail turnout.

FIG. 4 is a screen shot 400 of an example GUI of the rail network design software illustrating user interaction to connect a rail turnout 420 and another rail turnout 440. A rail turnout is disposed along a parent base element 410 (in this example a mainline having a geometry of an arc) while the another rail turnout 440 is disposed on another parent base element 430 (in this example, a branch line having the geometry of an arc). The user desires to connect the rail turnout 420 to the another railway turnout 440 by a connecting element 450 (in this example, having the geometry of a line). In this example the railway turnout 420 is designated in the GUI as free, such that its parameters (e.g., its location along the parent base element 410) can be changed, while the another rail turnout 440 is designated in the GUI as fixed, such that its parameters (e.g., location on the parent base element 430) cannot be changed. Using a dialog box 460, the user may trigger the geometry connection process 340 and its connection computation engine 360 to determine a connection between the rail turnouts 420, 440 by fitting a connection solution describing changes to the free parameters to the geometry.

Figure 5:
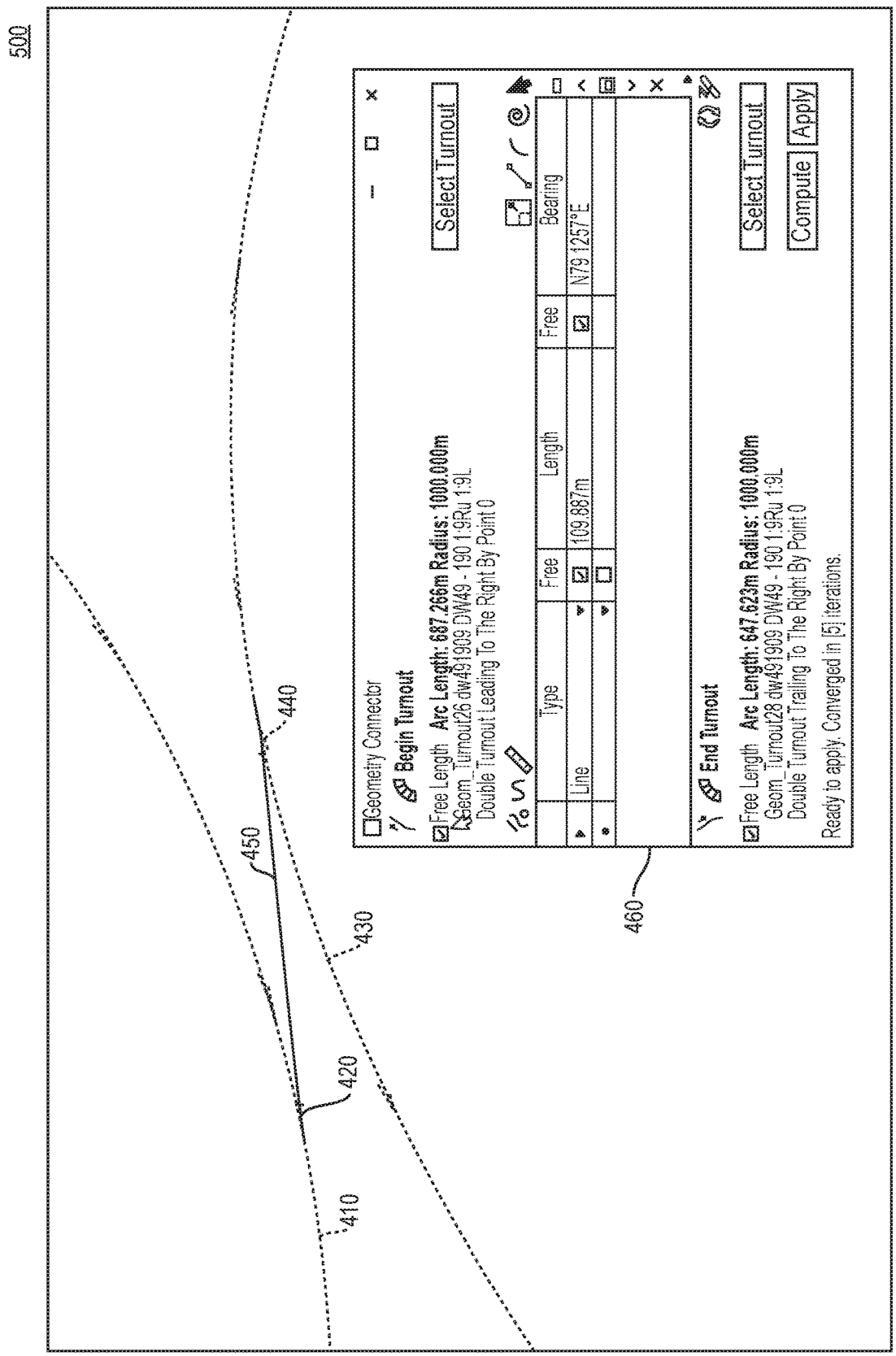
FIG. 5 is a screen shot of an example GUI of the rail network design software illustrating display of a computed connection between a rail turnout and another rail turnout.

FIG. 5 is a screen shot 500 of an example GUI of the rail network design software illustrating display of a computed connection between the rail turnout 420 and another rail turnout 440.

As discussed above, traditionally, to determine the connection the actual complexity actual geometry (e.g., combinations of multiple spirals, arcs, line segments, etc.) of each rail turnout would be used. Such actual complexity geometry would sometimes cause the fitting algorithm (e.g., least squares) of the connection computation engine 360 to fail and would cause high utilization of processing and memory resources.

In order to increased the likelihood of converging to a connection solution, lower processing and memory resource usage, as well as achieve other benefits, the geometry connection process 340 may reduce the actual complex geometry of each rail turnout to a simplified arc, which at one end is tangent to the geometry of the connecting element at the end of the rail turnout, and at the other end is tangent to the geometry of the parent base element of the rail turnout (as given by an attachment element). The simplified arc is utilized instead of the actual complex geometry of the rail turnout by the connection computation engine 360.

Figure 6:
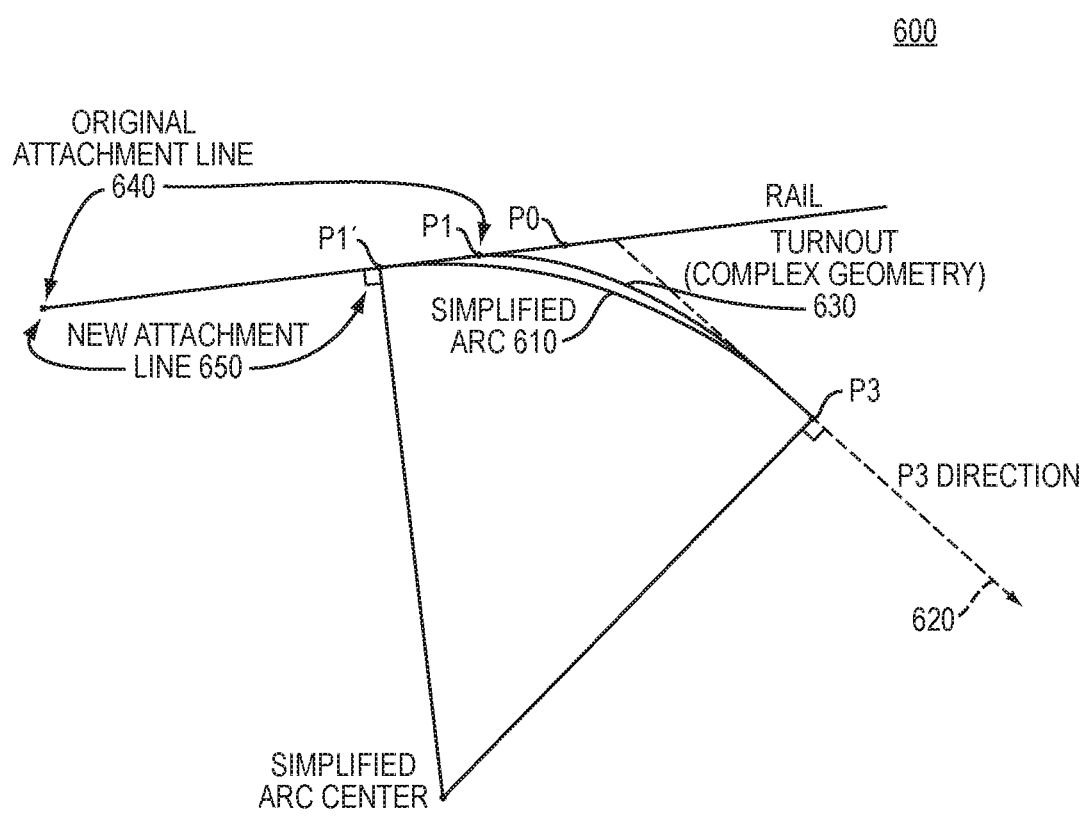
FIG. 6 is a diagram illustrating a first example of reducing an actual complex geometry of a rail turnout to a simplified arc.

FIG. 6 is a diagram 600 illustrating a first example of reducing an actual complex geometry of a rail turnout to a simplified arc 610. In this example, for clarity, only a single rail turnout is illustrated and the connection geometry is dictated by a connection element having a geometry of a line 620, starting from a point P3 and extending in a P3 direction. It should be understood, however, that in a typical usage, the connecting element may be coupled to another rail turnout or other rail element which dictates aspects of the connection.

The turnout in FIG. 6 has an actual complex geometry 630 composed of a combination of geometric primitives (e.g., spirals, arcs, line segments, etc.) that extends from point P1 to point P3 at the end of the rail turnout. An original attachment line 640 extends to point P1 along the parent base element. The geometry connection process 340 reduces the actual complex geometry 630 to a simplified arc 610, which at point P3 is tangent to the geometry of the connecting element (the line 620), and at the other end is tangent to the geometry of a parent base element (as given by a new attachment line 650 that extends to point P1' along the parent base element). The new attachment line 650 may be different than the original attachment line 640.

A system of linear equation is defined based on the geometry of the parent base element (as given by the new attachment line 650), the simplified arc, and the geometry of the connecting element (the line 620) and used by the connection computation engine 360 in connection determination. The actual complex geometry 630 is not used in the calculations.

Figure 7:
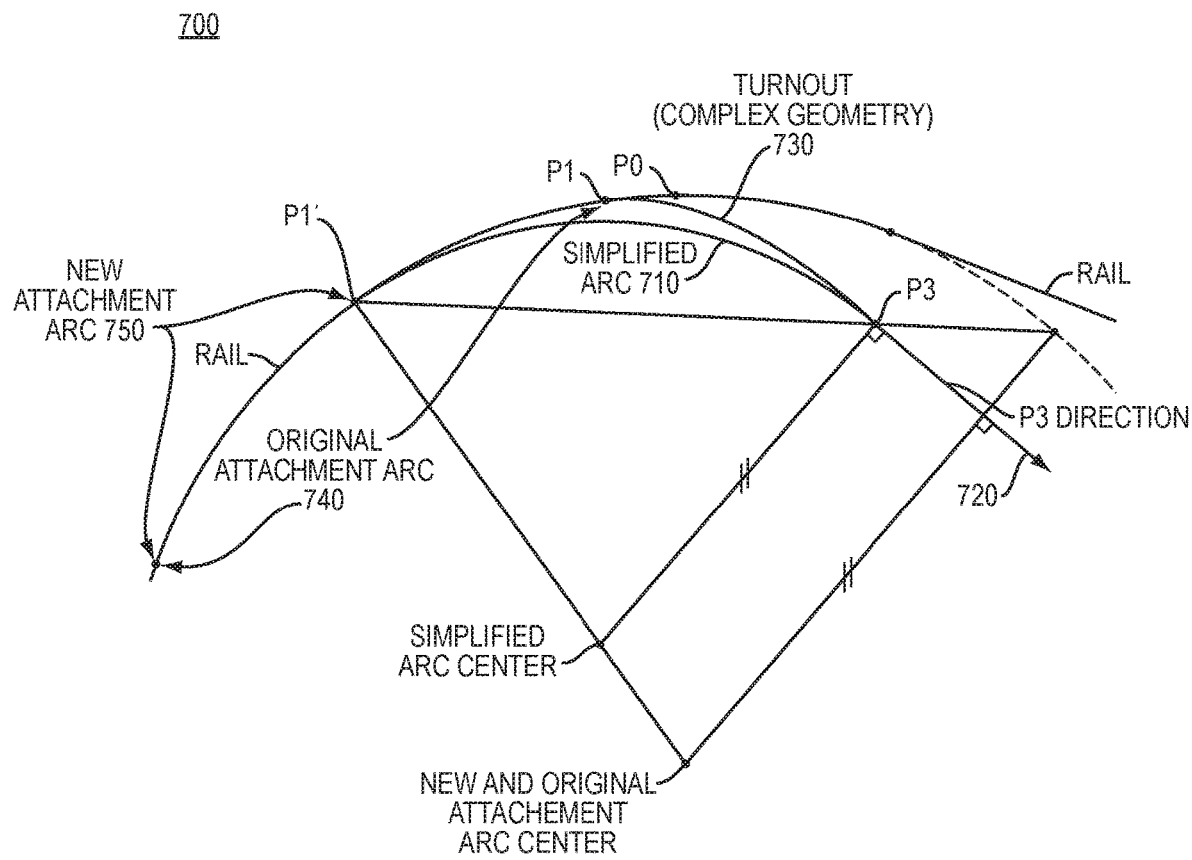
FIG. 7 is a diagram illustrating a second example of reducing an actual complex geometry of a rail turnout to a simplified arc.

FIG. 7 is a diagram 700 illustrating a second example of reducing an actual complex geometry of a rail turnout to a simplified arc 710. Again, for clarity, only a single rail turnout is illustrated and the connection geometry is dictated by a connecting element having a geometry of a line 720, starting from a point P3 and extending in a P3 direction. It should be understood, however, that in a typical usage the connecting element may be coupled to another rail turnout or other rail element which dictates aspects of the connection.

The turnout in FIG. 6 has an actual complex geometry 730 composed of a combination of geometric primitives (e.g., spirals, arcs, line segments, etc.) that extends from point P1 to point P3 at the end of the rail turnout. An original attachment arc 740 extends to point P1 along the parent base element. The geometry connection process 340 may reduce the actual complex geometry 730 to a simplified arc 710 which at point P3 is tangent to the geometry of the connecting element (the line 720), and at the other end is tangent to the geometry of a parent base element (as given by a new attachment arc 750 that extends to point P1' along the parent base element).

A system of linear equation is defined based on the geometry of the parent base element (as given by the new attachment arc 750), the simplified arc, and the geometry of the connecting element (the line 720) and used by the connection computation engine in connection determination. The actual complex geometry 730 is not used in the calculations.

Figure 8:
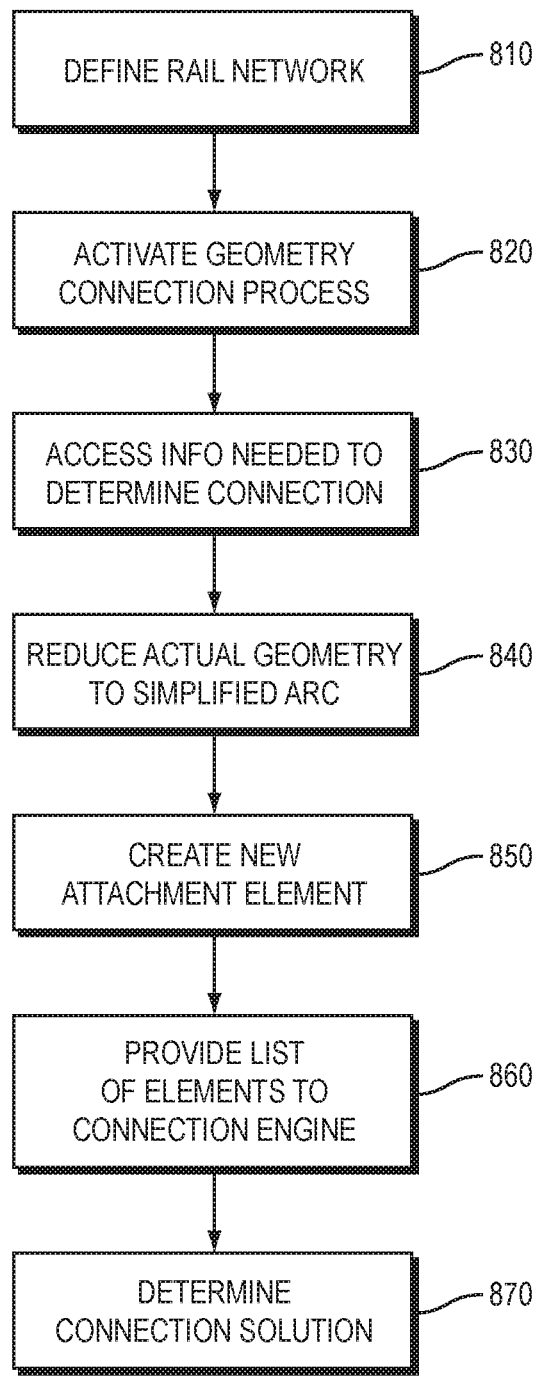
FIG. 8 is a flow diagram of an example sequence of steps for determining a connection between a rail turnout and another rail turnout or other rail element.

FIG. 8 is a flow diagram of an example sequence of steps 800 for determining a connection between a rail turnout and another rail turnout or other rail element. At step 810, a rail network is defined. For example, a user may activate the network design software 300 and use the GUI to create a model of a rail network using the rail designs 320 and turnout designs 330 obtained from the component library or specially defined by the user. In one example, the user may place two railways (e.g., a mainline and a branch line) and a turnout on each. Each turnout may have an actual complex geometry. The user may designate one of the railway turnouts to be a beginning turnout and one to be an ending turnout, for purposes of connection determination. At step 820, the geometry connection process 340 is activated. For example, a user may activate an interface element in the GUI.

At step 830, the geometry connection process 340 accesses information needed to determine the connection. The information may include information already in the model, such as the actual geometry of each rail turnout, a parent base element (and original attachment element) for each rail turnout, and the like. The information may also include information provided by the user in a dialog box 460 in the GUI, such as a list of one or more connecting elements (e.g., between the beginning turnout and the ending turnout) and an indication of which geometry parameters are free and which are fixed.

At step 840, the geometry connection process 340 reduces the actual geometry of each rail turnout to a simplified arc that at one end is tangent to a geometry of the connecting element it is attached to. For example, if the connecting element has a geometry of a line, the geometry connection process 340 may reduce the actual geometry to a simplified arc that at point P3 is tangent to the line. Similarly, if the connecting element has a geometry of arc, the geometry connection process 340 may reduce the actual geometry to a simplified arc that at point P3 is tangent to the arc.

At step 850, the geometry connection process 340 creates a new attachment element along the parent base element for each simplified arc that is tangent to the geometry of the respective rail turnout's parent base element. For example, if the parent base element has a geometry of a line, the geometry connection process 340 creates a new attachment line from the end of the simplified arc that may overlap a portion of the original attachment line. Similarly, if the parent base element has a geometry of an arc, the geometry connection process 340 creates a new attachment arc from the end of the simplified arc that may overlap a portion of the original attachment arc.

At step 860, a list of elements is provided to the connection computation engine 360 that includes the parent base element(s) (new attachment line(s)), the simplified arc(s), and connecting element(s). Referring to the above discussed example with two rail turnouts, the list may include the geometry of the parent base element of the beginning turnout (as given by the new attachment line for the beginning turnout), the simplified arc of the beginning turnout, one or more connecting elements, the simplified arc of the ending turnout, and the geometry of the parent base element of the ending turnout (as given by the new attachment line for the ending turnout).

At step 870, the connection computation engine 360 determines a connection solution using a system of linear equations that include the geometry of each of the elements on the list of elements. It should be noted that the actual complex geometry of each rail turnout is not used in the determination. Referring to the above discussed example with two rail turnouts, the linear equations may describe the geometry of the parent base element of the beginning turnout (as given by the new attachment line for the beginning turnout), the simplified arc of the beginning turnout, one or more connecting elements, the simplified arc of the ending turnout, and the geometry of the parent base element of the ending turnout (as given by the new attachment line for the ending turnout). The connection computation engine 340 may change free parameters (e.g., move turnout locations along their parent base elements by adjusting attachment elements) to facilitate the connection.

Finally, at step 880 the geometry connection process 340 returns the determined connection, displaying it in the GUI, persistently storing it to a storage device, or otherwise providing the result.

Figure 9:
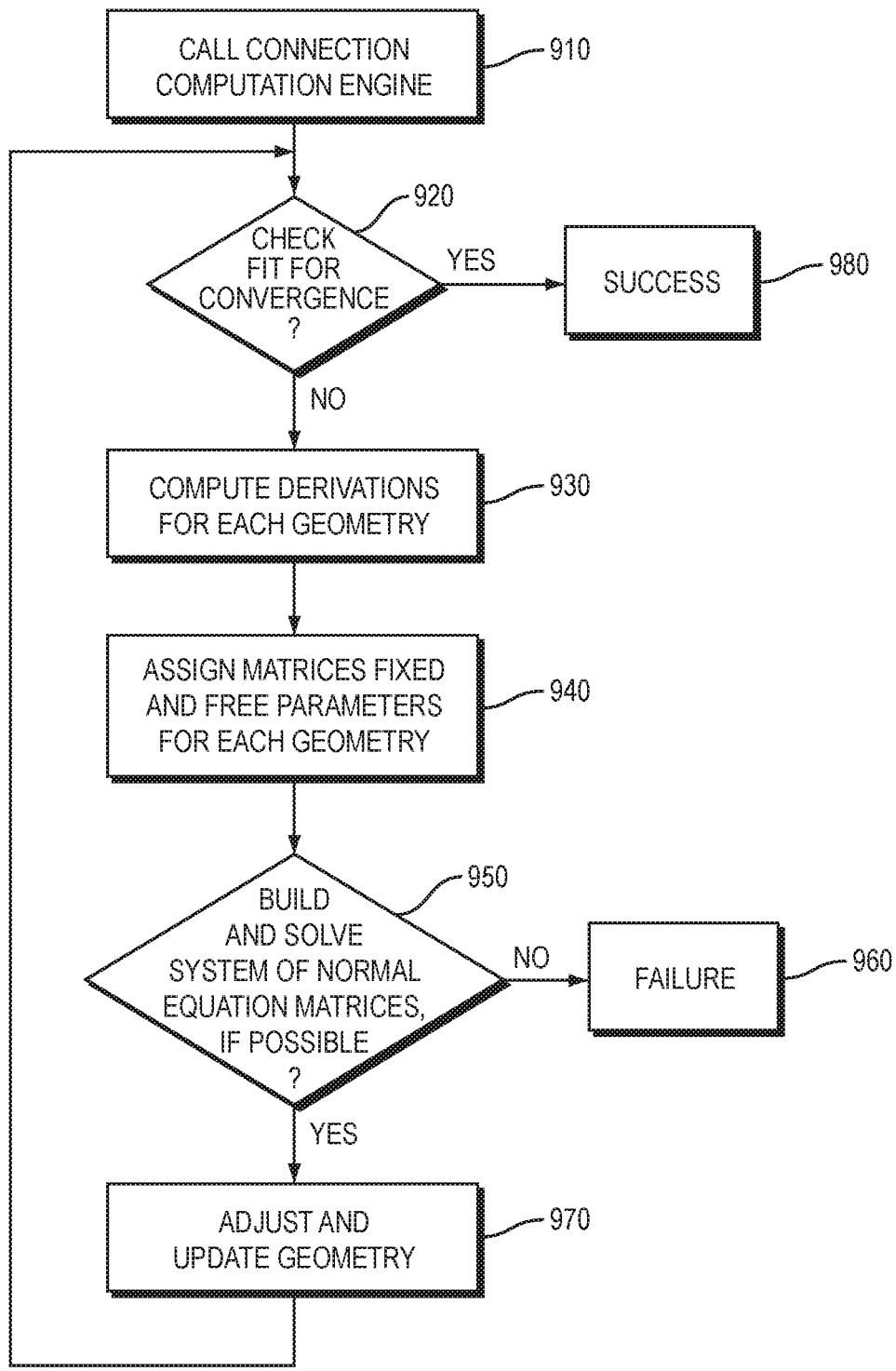
FIG. 9 is a flow diagram detailing steps that may be performed by the connection computation engine to determine a connection solution.

FIG. 9 is a flow diagram detailing steps that may be performed by the connection computation engine 360 to determine a connection solution as part of step 870 of FIG. 8. At step 910, the connection computation engine 360 is called and provided with geometry of each of the elements on the list of elements. At step 920, the connection computation engine 360 checks a least squares fit for convergence to a connection solution. Provided there is not yet convergence, execution proceeds to step 930, where the connection computation engine 360 computes derivatives for each geometry. Then at step 940, the connection computation engine 360 assigns matrices fixed and free parameters for each geometry. At step 950, the connection computation engine 360 uses the matrices to build and solve a system of normal equation matrices, if possible. In one implementation, the normal equations matrices may be represented as:

$$(JT*W*J)x = (JT*W)b$$

where matrix b is right hand side (RHS) independent or regressor data, matrix J is a Jacobean matric that contains a row for the geometry of each element on the list and columns that include parameters of the respective geometry (e.g., length, azimuth, radii, spiral parameters, etc.), matrix W is a weight for each variable data, matrix JT is the transpose of matrix J, and matrix x is the solution to be solved for.

When solving for matrix x, the inverse of matrix JTWJ will generally need to be computed. One technique to compute the inverse of matrix JTWJ that may be used by the connection computation engine 360 is the Gauss Jordon Pivoting method. After multiple repetitions, the values of the matrix JTWJ may become quite large or quite small. If the values fall beyond certain thresholds (e.g., are less than $1*10^{-20}$) it may be impossible to compute the inverse, and execution may proceed to step 960 where the connection determination fails. While such failure may occur on occasion if original complex geometries were used, reduction to simplified arcs leads to fewer rows and columns in the matrices, making failure unlikely.

At step 970, the connection computation engine 360 updates one or more of the geometries of the elements on the list based on the solution from step 950. Execution then loops back to step 920, where the connection computation engine 360 checks the least squares fit for convergence to a connection solution. If convergence is achieved, execution proceeds to step 980, where the connection solution is returned.

It should be understood that various adaptations and modifications may be readily made to what is described above, to suit various implementations and environments. While it is discussed above that many aspects of the techniques may be implemented by specific software processes executing on certain hardware, it should be understood that some or all of the techniques may also be implemented by different software on different hardware. In addition to general-purpose electronic devices, the hardware may include specially configured logic circuits and/or other types of hardware components. Above all, it should be understood that the above descriptions are meant to be taken only by way of example.

What is claimed is:

1. A method for determining a connection between a rail turnout and another rail turnout or other rail element in a model of a rail network, comprising:

receiving, in a graphical user interface (GUI) of rail network design software executing on one or more electronic devices, a request to automatically determine a connection between the rail turnout and another rail turnout or other rail element, the connection describing changes to a free parameter;

accessing, by a geometry connection software process of the rail network design software, an actual geometry of the rail turnout in the model, wherein the rail turnout is located along a parent base element, and an end of the rail turnout is to be connected to a connecting element coupled to the another rail turnout or other rail element;

reducing, by the geometry connection software process, the actual geometry of the rail turnout in the model to a simplified arc that at one end is tangent to a geometry of is the connecting element;

creating, by the geometry connection software process, an attachment to the parent base element such that the simplified arc is tangent to the geometry of the parent base element;

determining, by the geometry connection software process, the connection between the rail turnout and the another rail turnout or other rail element by applying a fitting algorithm to the geometry of the parent base element, the simplified arc, and the geometry of the connecting element, but not the actual geometry of the rail turnout in the model to reduce consumption of processing and memory resources of the one or more electronic devices, wherein the fitting algorithm converges over one or more iterations to a connection solution describing changes to the free parameter; and after convergence to the connection solution, returning the determined connection to the GUI and displaying, by the GUI, the determined connection.

2. The method of claim 1, wherein the simplified arc is tangent to the geometry of the parent base element at a different point than the actual geometry of the rail turnout.

3. The method of claim 1, wherein the actual geometry of the rail turnout includes a combination of multiple geometric primitives.

4. The method of claim 3, wherein the combination of multiple geometric primitives includes combinations of multiple spirals, arcs, and/or line segments.

5. The method of claim 1, wherein the parent base element has a geometry of a line, and the reducing produces a simplified arc that at the one end is tangent to the line at a point where the line meets the end of the rail turnout.

6. The method of claim 5, wherein the geometry of the parent base element is described by an attachment line, and an original attachment line defined by the geometry of the rail turnout is different than a new attachment line defined by the simplified arc.

7. The method of claim 1, wherein the parent base element has a geometry of an arc, and the reducing produces a simplified arc that at the one end is tangent to the arc at a point where the arc meets the end of the rail turnout.

8. The method of claim 7, wherein the geometry of the parent base element is described by an attachment arc, and an original attachment arc defined by the geometry of the rail turnout is different than a new attachment arc defined by the simplified arc.

9. The method of claim 1, wherein the fitting algorithm is a least squares algorithm and the determining further comprises:

computing derivatives for each geometry;

assigning matrices fixed and free parameters for each geometry;

building and solving normal equation matrices;

adjusting and updating one or more of the geometries; and checking a least squares fit for convergence to the connection solution.

10. An electronic device, comprising:
a processor; and
a memory coupled to the processor and configured to store rail network design software that includes
a geometry connection software process that is configured to
access an actual geometry of a rail turnout in a model of a rail network, the actual geometry of the rail turnout in the model to include a combination of multiple geometric primitives, and
reduce the actual geometry of the rail turnout in the model to a simplified arc, and
a connection computation engine that is configured to
determine a connection between the rail turnout and another rail turnout or other rail element by applying a fitting algorithm to geometry including the simplified arc, but not the actual geometry of a rail turnout in the model to reduce consumption of processing and memory resources of the electronic device, wherein the fitting algorithm converges over one or more iterations to a connection solution describing changes to a free parameter, and
a user interface (UI) software process that is configured to receive a request to automatically determine the connection between the rail turnout and another rail turnout or other rail element and display the determined connection.

11. The electronic device of claim 10, wherein the simplified arc is tangent to the geometry of a parent base element at a different point than the actual geometry of the rail turnout.

12. The electronic device of claim 10, wherein the combination of multiple geometric primitives includes combinations of multiple spirals, arcs, and/or line segments.

13. A non-transitory electronic-device readable medium having instructions stored thereon, the instructions when executed by one or more electronic devices operable to:
receive a request to automatically determine a connection between the rail turnout and another rail turnout or other rail element, the connection describing changes to a free parameter;
access an actual geometry of a rail turnout in a model or a rail network, the rail turnout located along a parent base element with an end of the rail turnout to be connected to a connecting element;
reduce the actual geometry of the rail turnout in the model to a simplified arc that at one end is tangent to a geometry of the connecting element;
create an attachment to the parent base element such that the simplified arc is tangent to the geometry of the parent base element;
determine a connection between the rail turnout and another rail turnout or other rail element by applying a fitting algorithm to the geometry of the parent base element, the simplified arc, and the geometry of the connecting element, but not the actual geometry of the rail turnout in the model, wherein the fitting algorithm converges over one or more iterations to a connection solution describing changes to a-the free parameter; and
return the determined connection and display the determined connection, after convergence to the connection solution.

14. The non-transitory electronic-device readable medium of claim 13, wherein the simplified arc is tangent to the geometry of the parent base element at a different point than the actual geometry of the rail turnout.

15. The non-transitory electronic-device readable medium of claim 13, wherein the actual geometry of the rail turnout includes a combination of multiple geometric primitives.

16. The non-transitory electronic-device readable medium of claim 15, wherein the combination of multiple geometric primitives includes combinations of multiple spirals, arcs, and/or line segments.

17. The non-transitory electronic-device readable medium of claim 13, wherein the parent base element has a geometry of a line, and the reducing produces a simplified arc that at the one end is tangent to the line at a point where the line meets the end of the rail turnout.

18. The non-transitory electronic-device readable medium of claim 17, wherein the geometry of the parent base element is described by an attachment line, and an original attachment line defined by the geometry of the rail turnout is different than a new attachment line defined by the simplified arc.

19. The non-transitory electronic-device readable medium of claim 13, wherein the parent base element has a geometry of an arc, and the reducing produces a simplified arc that at the one end is tangent to the arc at a point where the arc meets the end of the rail turnout.

20. The non-transitory electronic-device readable medium of claim 19, wherein the geometry of the parent base element is described by an attachment arc, and an original attachment arc defined by the geometry of the rail turnout is different than a new attachment arc defined by the simplified arc.

* * * * *

UNITED STATES PATENT AND TRADEMARK OFFICE
CERTIFICATE OF CORRECTION

| | | |
|---|---|---|
| PATENT NO. | : 11,780,480 B1 | |
| APPLICATION NO. | : 16/590028 | |
| DATED | : October 10, 2023 | |
| INVENTOR(S) | : Joseph G. Ashe | |

It is certified that error appears in the above-identified patent and that said Letters Patent is hereby corrected as shown below:

In the Claims

Column 8, Line 10:
Claim 1 reads:
"of is the connecting element;"
Should read:
--of the connecting element;--

Column 10, Line 11:
Claim 13 reads:
"solution describing changes to a-the free parameter;"
Should read:
--solution describing changes to the free parameter;--

Signed and Sealed this
Ninth Day of April, 2024

*Katherine Kelly Vidal*

Katherine Kelly Vidal
*Director of the United States Patent and Trademark Office*